United States Patent [19]

Ishiyama

[11] 4,368,381

[45] Jan. 11, 1983

[54] NUMERAL ADDING TOY

[75] Inventor: Shozo Ishiyama, Tokyo, Japan

[73] Assignee: Kabushiki Kaisha Gakushu Kenkyusha (Gakken Co., Ltd.), Tokyo, Japan

[21] Appl. No.: 283,627

[22] Filed: Jul. 15, 1981

[30] Foreign Application Priority Data

| | | | |
|---|---|---|---|
| Jul. 15, 1980 | [JP] | Japan | 55-99525[U] |
| Nov. 13, 1980 | [JP] | Japan | 55-162680[U] |

[51] Int. Cl.[3] .......................... G06C 15/00; G09B 1/00

[52] U.S. Cl. ................................ 235/1 C; 235/91 PR; 235/116; 434/206

[58] Field of Search ................................ 235/1 R-1 F, 235/23, 24, 12, 14, 77, 82 R, 41, 78 R, 116, 91 PR; 434/206; 46/2

[56] References Cited

U.S. PATENT DOCUMENTS

| | | | |
|---|---|---|---|
| 1,227,054 | 5/1917 | Jacobs | 235/1 F |
| 2,476,580 | 7/1949 | Bergman | 434/206 |

*Primary Examiner*—Benjamin R. Fuller

*Attorney, Agent, or Firm*—Irving M. Weiner; Pamela S. Burt; John L. Shortley

[57] ABSTRACT

A numeral adding toy including an arrangement for rotationally indexing in a cooperative manner two rotary wheels displaying numerals to be added and a single rotary wheel displaying the added sum answer by means of a rotationally indexing mechanism including pins or ratchets. The wheel displaying the added answer is rotated the summed number of indexes of the two wheels displaying the numerals to be added. The wheels, having been rotationally indexed, are rotationally returned by means of a releasing mechanism.

15 Claims, 14 Drawing Figures

NUMERAL ADDING TOY

BACKGROUND OF THE INVENTION

1. Field of the Invention

The present invention relates to a numeral adding toy in which both numerals to be added and a numeral indicative of an added answer are displayed on the outer circumferences of a plurality of rotary wheels adapted to be rotationally indexed by depressing actuations.

2. Description of Relevant Art

A variety of toys using numerals have been proposed according to the relevant art. Of these, many toys to be used for learning arithmetic, such as addition, have been proposed, too. However, since most of them have numerals or pictures displayed on cards or the like, the toys themselves require few motions so that they are not very interesting. On the other hand, there have been proposed, too, calculating toys which are intended to interest children in learning arithmetic. All of these toys have so excessively complex constructions that they are unsuitable as toys because they are large-sized resulting in increased costs and a greater frequency in malfunctions. Especially for learning arithmetic, it is very important to awaken interest during childhood. Thus, it is desired to develop a calculating toy which can attract children and which has a simple construction not likely to malfunction.

The present invention was developed with a view to solving the problems concomitant with the calculating toys described above.

SUMMARY OF THE INVENTION

The present invention provides a numeral adding toy having means for rotationally indexing in a cooperative manner both a plurality of rotary wheels displaying numerals to be added and a single rotary wheel displaying a numeral indicative of an added answer by means of a rotationally indexing mechanism including pins or ratchets. The rotary wheel displaying the numeral indicative of the added answer is rotated a number of times corresponding to the summed indexes of those of the respective rotary wheels displaying the numerals to be added. The respective rotary wheels, having been rotationally indexed, are rotationally returned by means of a releasing mechanism.

It is an object of the present invention to provide a numeral adding toy of the type in which both the numerals to be added and the numeral indicative of the added answer of the former numerals are reliably brought to predetermined positions merely by actuating a rotationally indexing mechanism.

Another object of the invention is to provide to a numeral adding toy of the type in which the rotary wheels are rotated more than one rotation by equipping the pins or ratchets forming a part of the rotationally indexing mechanism with a stopper to make reliable calculations possible and to prevent in advance any problems.

Still another object of the invention is to provide a numeral adding toy of the type in which the rotary wheels are prevented from being rotated more than two indexes by a single actuation, either by forming regulating clicks in addition to push clicks on indexing levers forming a part of the rotationally indexing mechanism, or by bringing elastic members into abutment engagements with the rotary wheels to eliminate erroneous operations.

A further object of the invention is to provide a numeral adding toy of the type in which the push clicks are made not to obstruct the rotary wheels, when the latter are rotationally returned, by equipping indexing members with a rod that is cooperative with a releasing mechanism to release the engaging states between the push clicks and the pins.

A further object of the invention is to provide a numeral adding toy of the type in which two actuating levers for actuating the indexing members are prevented from simultaneous operation by interposing a rocking member for restraining one of the actuating levers upon actuation of the other between the two actuating levers to eliminate any erroneous calculations even if the adding toy is handled roughly by children.

A still further object of the invention is to provide a numeral adding toy which is made more interesting and attractive, either by arranging in a casing a bell for generating a ringing sound upon each rotational index, or by displaying picture corresponding to the numerals on the outer circumferences of the rotary wheels.

DETAILED DESCRIPTION OF PREFERRED EMBODIMENTS

Figure 1:
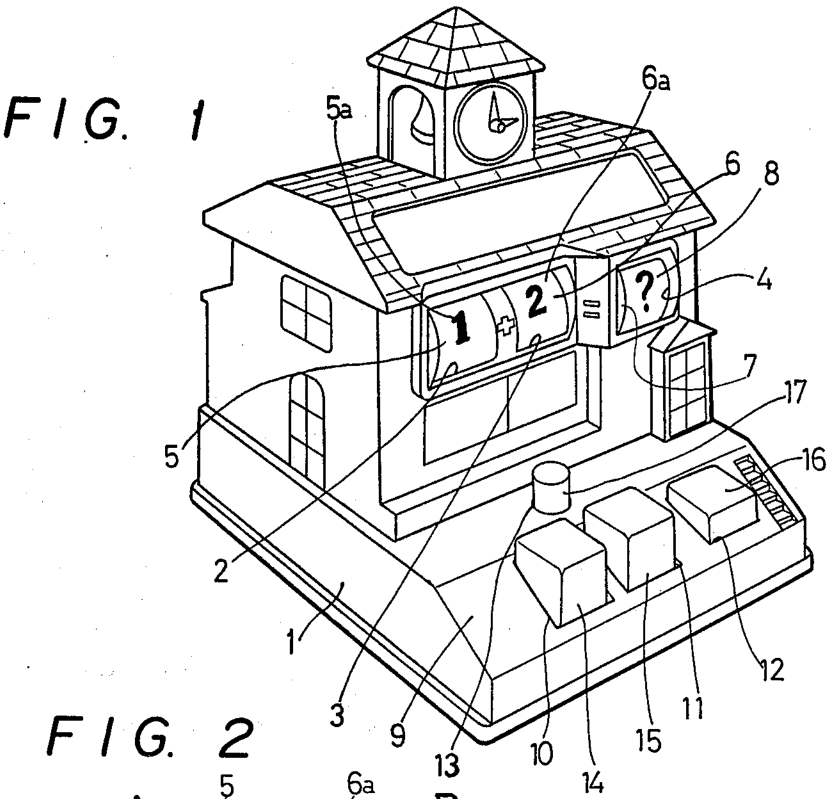
FIG. 1 is a perspective view showing the overall construction of a numeral adding toy according to the invention.
Figure 2:
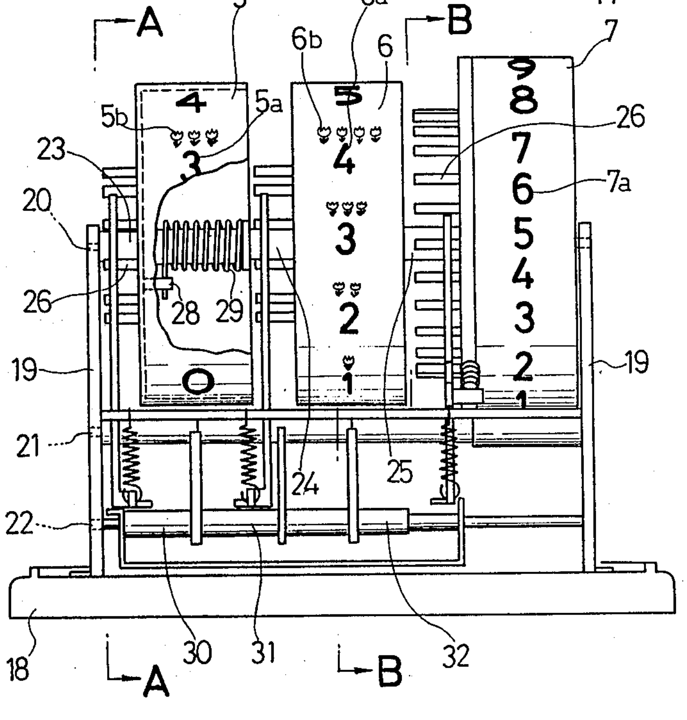
FIG. 2 is a partially broken front elevation showing the inside construction of the same adding toy.

FIG. 1 is a perspective view showing the overall construction of a numeral adding toy according to the invention. Reference numeral 1 indicates the casing of a numeral adding toy which resembles a house, and which is formed with apertures 2, 3 and 4 resembling windows such that the addition sign (+) and the equality sign (=) are displayed between apertures 2 and 3 and between apertures 3 and 4, respectively. Moreover, the numerals, which are displayed on the outer circumferences 5*a* and 6*a* of rotary wheels 5 and 6 and which are to be added, are made to appear in apertures 2 and 3, respectively. The numeral, which is displayed on the outer circumference of a rotary wheel 7, is made to appear in the aperture 4 but is shielded by a shielding plate 8. The casing 1 has its near side 9 formed with a plurality of openings 10, 11,12 and 13 in which are fitted, respectively, a push button 14 for rotationally indexing the wheels 5 and 7, a push button 15 for rotationally indexing the wheels 6 and 7, a push button 16 for pushing down the shielding plate 8 to allow the numeral displayed on wheel 7 to appear in aperture 4, and a push button 17 for rotationally returning the pin wheels 5, 6 and 7 until they are reset to their initial states.

FIGS. 2 to 5 show the inside mechanism of the adding toy according to the present invention. On a bottom plate 18, there stand a pair of supporting plates 19, between which spindles 20, 21 and 22 are supported.

On spindle 20, which is supported between the upper portions of plates 19, there are mounted three collars 23, 24 and 25 on which are fixed the wheels 5, 6 and 7 having a plurality of pins 26 protruding axially outwardly from the sides thereof so that they can freely rotate with respect to spindle 20. On the outer circumferences 5*a* and 6*a* of wheels 5 and 6, there are displayed both the numerals to be added and pictures 5*b* and 6*b* corresponding to those numerals.

Figure 3:
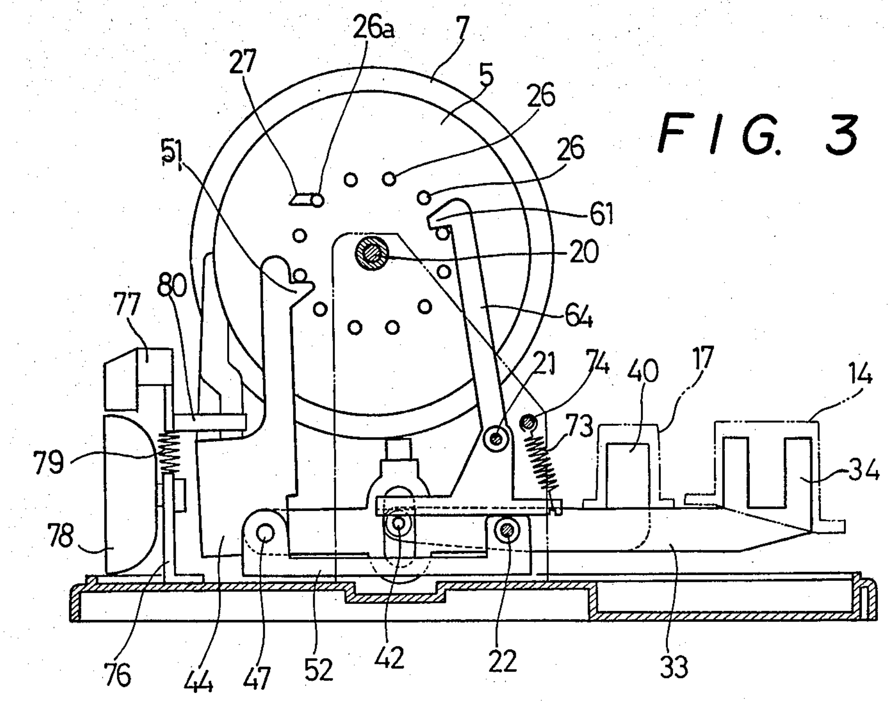
FIG. 3 is a section taken along line A—A of FIG. 2.
Figure 5:
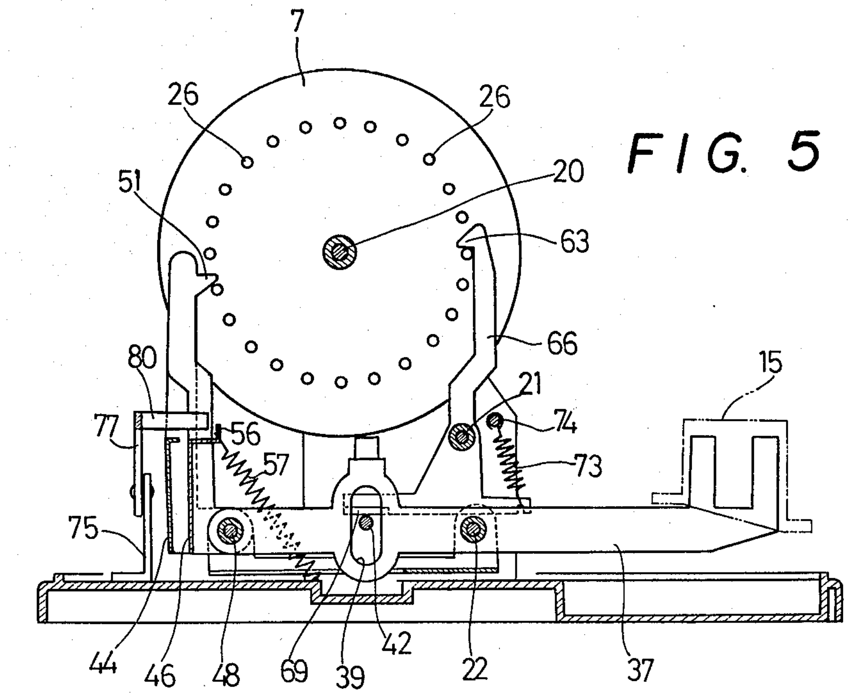
FIG. 5 is a section taken along line B—B of FIG. 2.
Figure 4:
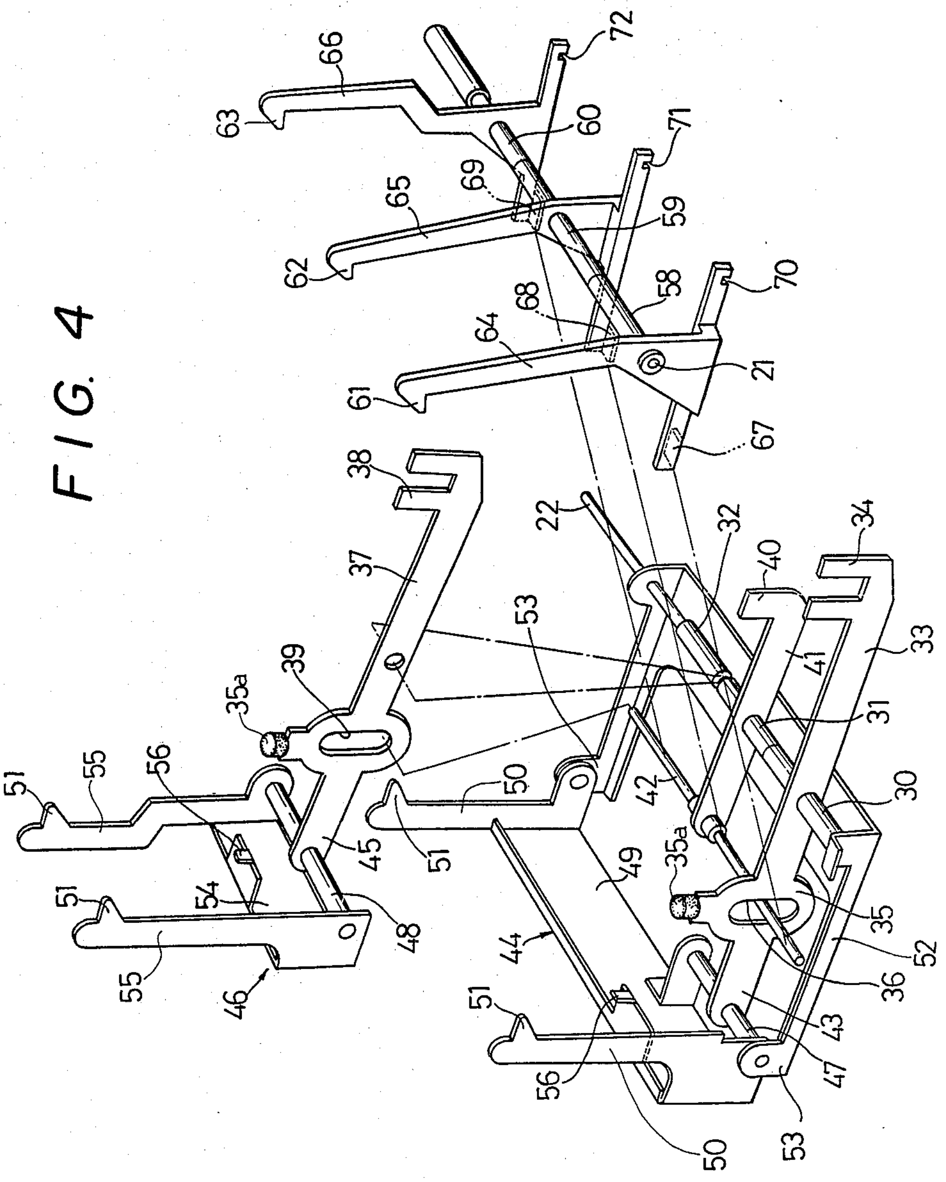
FIG. 4 is an explanatory perspective view showing the inside construction with its major parts being exploded.

The aforementioned plurality of pins 26 are equidistantly arranged to protrude from a circle about spindle 20 (FIG. 3). Twelve pins 26 are provided on each of wheels 5 and 6 having an identical shape and displaying the numerals to be added. Twenty-two pins 26 are provided on wheel 7 having a larger diameter and displaying the numeral indicative of the added answer, as shown in FIG. 5. One pin 26*a* of the pins 26 of each wheel 5 and 6 is formed with a stopper 27 which extends generally outwardly in the direction of a chord of the circular side thereof so that neither of wheels 5 and 6 may be rotated more than one rotation. On the outer circumferences 5*a* and 6*a* of wheels 5 and 6, there are displayed numerals "0" to "10" which are positioned to correspond to pins 26. On the outer circumference 7*a* of wheel 7, there are displayed numerals "0" to "20" which are positioned to correspond to pins 26. The index between the numerals "0" and "10" of each of wheels 5 and 6 and the index between the numerals "0" and "20" of wheel 7 are made with a larger spacing corresponding to one pin than the indexes between the adjacent ones of the remaining numerals.

From the inner side of each of wheels 5, 6 and 7, there is provided to axially protrude a retaining pin 28 (FIG. 2), on which is retained one end of a return spring 29 having its other end retained on either plate 19 or a stationary member so that spring 29 is biased by rotation of the corresponding one of wheels 5, 6 and 7.

On the spindle 22 (FIG. 4), which is supported between the lower portions of the supporting plates 19, there are mounted collars 30, 31 and 32 such that an actuating lever 33 is fixed on collar 30 in a manner to freely rotate with respect to spindle 22. The actuating lever 33 is formed (FIGS. 3 and 4), at its near end portion (i.e., at the right end portion as shown) with bifurcated upright members 34 which are positioned to be received in push button 14. The leading portion (i.e., the left end portion as shown) of actuating lever 33 is formed with a bulging portion 35, which carries an elastic member 35*a* of rubber at its upper end portion so as to abut against the circumferences of wheels 5 and 6 to regulate the rotating velocities of wheels 5 and 6. Portion 35 is formed with a vertically extending slot 36.

An actuating lever 37 having the same shape as that of lever 33 is fixed on collar 32 such that it can freely rotate with respect to spindle 22. Bifurcated upright members 38, which are formed at the right end of lever 37, are positioned to be received in push button 15. On collar 31, which is interposed between the collars 30 and 32, there is fixed an actuating lever 41, which has its right end portion 40 positioned to be received in push button 17, such that it can freely rotate with respect to spindle 22. Rod member 42 is fixed to extend through the left end portion of lever 41 such that both its ends are positioned to be received without any interference in slots 36 and 39 of levers 33 and 37.

To the leading ends 43 and 45 of levers 33 and 37, there are hinged by means of pins 47 and 48, respectively, indexing members 44 and 46 which are made operative to rotationally index the wheels 5 and 7 and the wheels 6 and 7, respectively.

Indexing member 44 is constructed such that both ends of a plate member 49, having a length substantially equal to the spacing between the pins of wheel 5 and the pins of wheel 7, are inwardly bent and such that the resultant bent portions are extended upwardly to form indexing levers 50 and to have their upper extremities formed with push clicks 51 for pushing up and rotating the pins 26. The base portions of the bent portions are hinged to the leading end portions 53 of a supporting plate 52, which in turn is fitted on spindle 22 such that both push clicks 51 are held at the same level.

Indexing member 46 is constructed such that both ends of a plate member 54, having a length substantially equal to the spacing between the pins of wheel 6 and the pins of wheel 7, are inwardly bent and such that the resultant bent portions are extended upwardly to form indexing levers 55 and to have their upper extremities formed with push clicks 51 for pushing up and rotating the pins of wheels 6 and 7. The respective members 44 and 46 are formed with hooked portions 56, on which are retained (FIG. 5) one end of springs 57 having their other ends fixed on bottom plate 18, thus urging indexing members 44 and 46 in a downward direction.

Thus, a rotationally indexing mechanism is constructed including pins 26, actuating members 33 and 37, indexing members 44 and 46, and indexing levers 50 and 55 formed with push clicks 51.

On spindle 21 there are mounted collars 58, 59 and 60 (FIG. 8), to which are fixed the intermediate portions of bent arms 64, 65 and 66 respectively formed with stop clicks 61, 62 and 63 engageable with pin 26, such that the bent arms can freely rotate with respect to that spindle. The base end portions of arms 64, 65 and 66 are extended in the longitudinal direction (i.e., to the right and left in FIG. 3) such that there are attached to the lower sides of the front end portions thereof abutment members 67, 68 and 69 against which rod member 42 can abut. The lower sides of the rear end portions thereof are formed with notches 70, 71 and 72, on which are retained one end of springs 73 having their other ends fixed to a stationary pin 74 supported between the supporting plates 19. Arms 64, 65 and 66 are thus biased counter-clockwise (as viewed in the drawing) so that clicks 61, 62 and 63 are retained on pins 26.

Thus, a releasing mechanism is constructed including actuating lever 41, to which rod member 42 is fixed, and arm levers 64, 65 and 66 which are formed with stop clicks 61, 62 and 63.

In the width direction of the side end portion of plate 18 (FIGS. 3 and 5), there are provided two brackets 75 and 76 such that a knock member 77 is hinged at its base end portion to bracket 75, and a bell 78 is fixed to bracket 76. Member 77 has its lower side supported by means of a spring 79 so that the knocking portion of member 77 is positioned above bell 78. The upwardly protruding members 80 of the plate members 49 and 54 of the indexing members 44 and 46 contact member 77 so that member 77 is swung upwardly and downwardly about its hinged portion, respectively, when the indexing members 44 and 46 are moved upwardly and downwardly by the swinging motion of the actuating levers 33 and 37, until it is forced to knock the bell 78.

Shielding plate 8 is interposed between aperture 4 and the outer circumference of wheel 7. Plate 8 has its lower end biased upwardly by means of the spring which has its one end fixed to the inner side of the casing 1, and has its lower end portion jointed to the connecting lever coacting with push button 16, whereby it is moved downwardly when push button 16 is depressed to allow the outer circumference 7*a* of wheel 7 to appear in aperture 4.

The respective rotary wheels 5, 6 and 7 are attached to spindle 20 so that the numeral appearing in aperture 4 becomes "0" when both the numerals appearing in apertures 2 and 3 are made "0".

Figure 6:
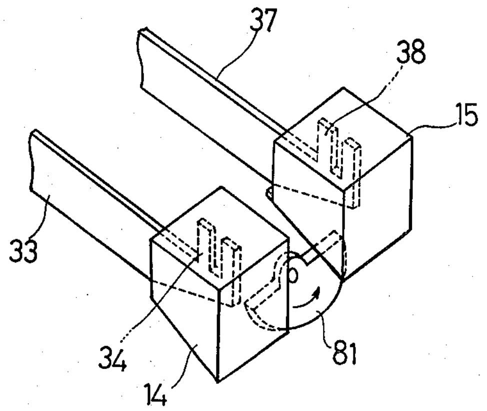
FIG. 6 is a perspective view showing a rocking member.

FIG. 6 shows a mechanism for preventing wheels 5 and 6 from simultaneously rotating. In this mechanism, a rocking member 81 having a generally semicircular side is attached in a rockable manner to the bracket which is mounted on the bottom plate 18 at an intermediate position between the bifurcated upright members 34 of actuating lever 33 and the bifurcated upright members 38 of actuating lever 37. The rocking member 81 as thus attached has its right and left upper end faces positioned below the lower end faces of push buttons 14 and 15, respectively, such that it is rocked in the direction of the arrow in the drawing when one push button, e.g., the push button 14, is depressed. It is rocked in the opposite direction when the other push button 15 is depressed. Thus, both actuating levers 33 and 37 cannot be simultaneously depressed.

If push buttons 14 and 15 could be simultaneously depressed, the wheel 7 would index not the sum of the numbers of the rotational indexes of the wheels 5 and 6 but the number, in which push buttons 14 and 15 are simultaneously depressed, so that an erroneous answer would be displayed in aperture 4. Therefore, if push buttons 14 and 15 are simultaneously depressed, they are brought to abut against the upper end of the rocking member 81 to thereby push the same in the opposite directions to each other so that actuating levers 33 and 37 are not swung.

Figure 7:
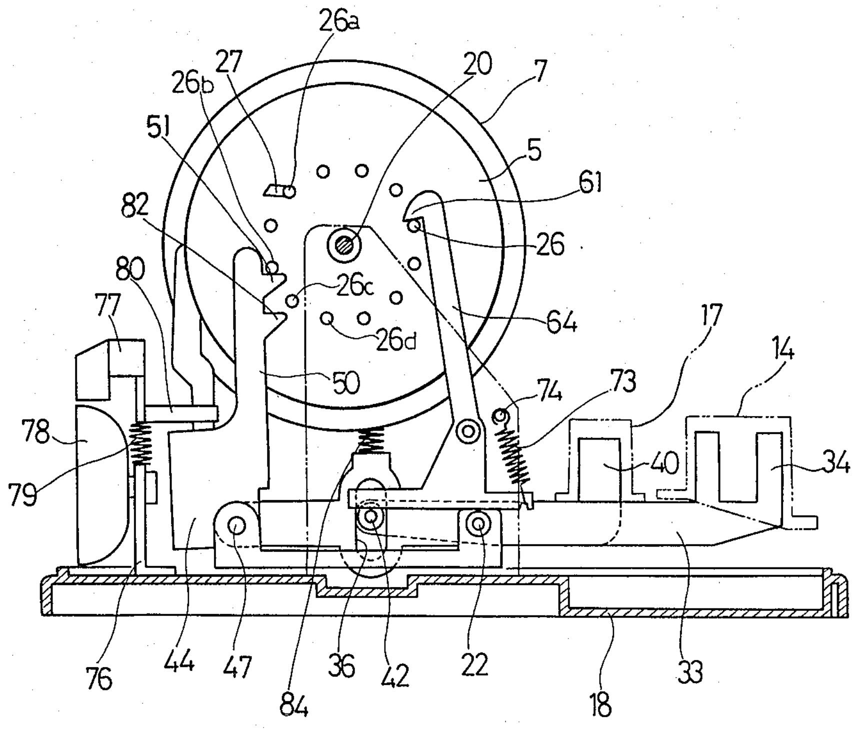
FIG. 7 is similar to FIG. 3 but shows a second embodiment.
Figure 8:
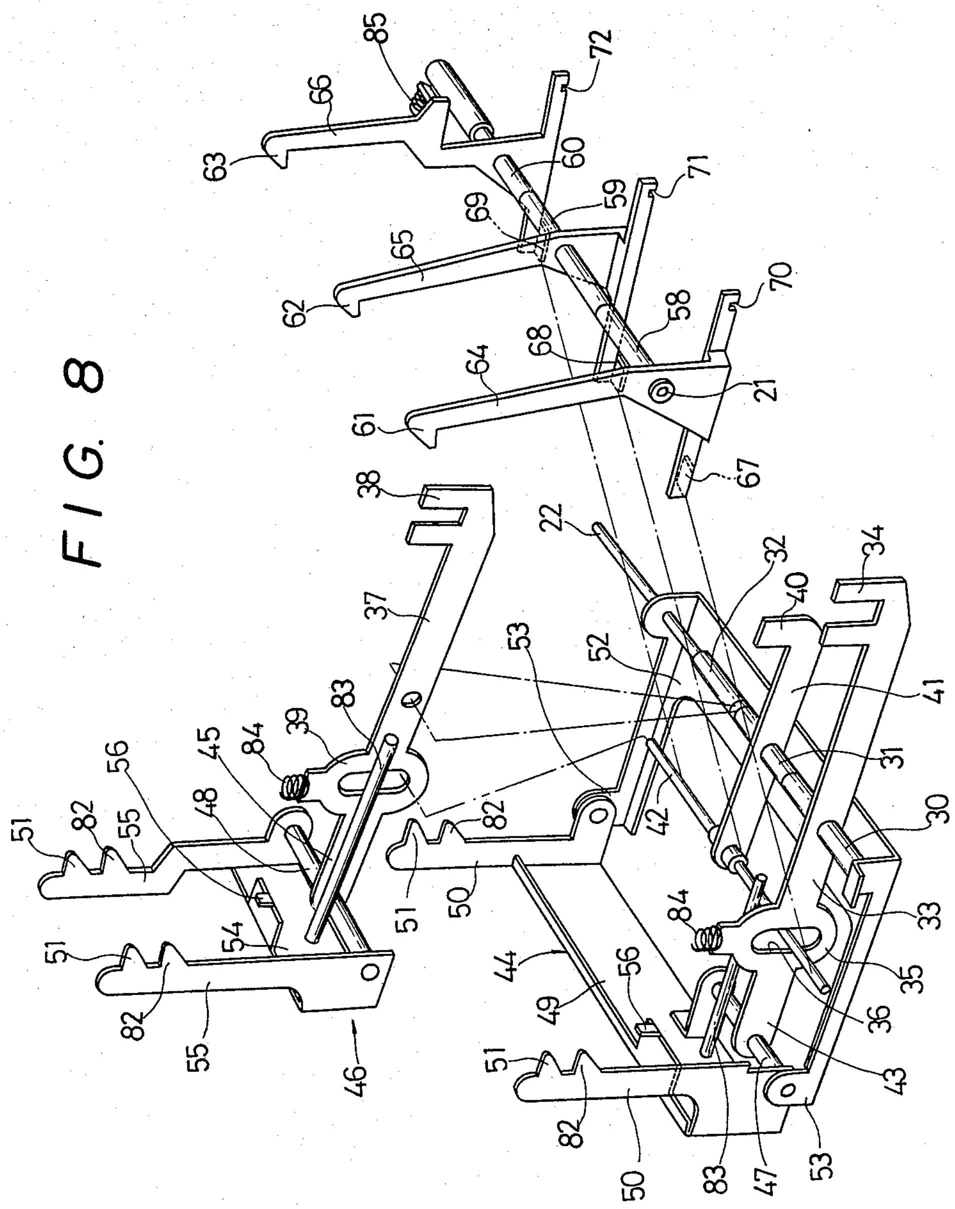
FIG. 8 is similar to FIG. 4 but shows the inside construction of the second embodiment.
Figure 9:
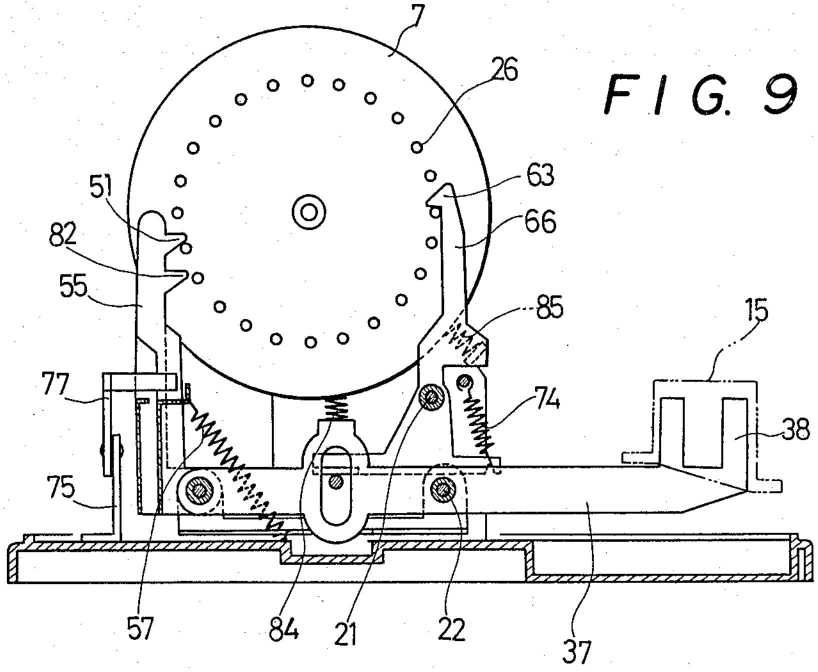
FIG. 9 is similar to FIG. 5 but shows the second embodiment.

A modified embodiment of the present invention is shown in FIGS. 7 to 9, in which corresponding members as those of the foregoing embodiment are indicated by corresponding reference numerals. The differences from the foregoing embodiment reside in: the indexing levers 50 and 55 forming a part of the rotationally indexing mechanism are equipped with regulating clicks 82; there are fixed to the indexing members 44 and 46 a rod 83 which has its leading end portion extending above rod member 42 forming a part of the releasing mechanism; and springs 84 adapted to abut against the circumferences of wheels 5 and 6 are mounted on the upper end portions of bulging portions 35 of the actuating levers 33 and 37, and a spring adapted to abut against the circumference of wheel 7 is mounted on arm lever 66.

By forming the regulating clicks 82 below the push clicks 51 such that they are bifurcated, the regulating clicks 82 go between pins 26*c* and 26*d* (FIG. 7) when pin 26*b* is raised by the corresponding push click 51, so that wheels 5, 6 and 7 are prevented from being rotated more than two indexes by the single indexing operation.

Because rod 83 made cooperative with rod member 42 is fixed to the indexing members 44 and 46, the rod member 42 is raised when the actuating lever 41 is swung clockwise (as viewed in FIG. 7) so that rod 83 is accordingly swung counter-clockwise. Then, indexing members 44 and 46 are swung counter-clockwise to release the retaining states between push clicks 51 and pins 26. As a result, the rotary wheels 5, 6 and 7 are rotationally returned in a smooth manner without any obstruction of the push clicks.

Because arm lever 66 is equipped with spring 85 adapted to abut against the circumference of wheel 7, a higher rotational velocity of wheel 7 than that required can be restrained so that an erroneous answer is prevented from being displayed.

When push button 14 is depressed, it swings actuating lever 33 clockwise about spindle 22 because it is connected to the bifurcated upright members 34 of lever 33. Then, the lower end of slot 36 formed in lever 33 is brought to abut against member 42 so that lever 41 is swung clockwise against the action of springs 73 to release the engaging state between pin 26 and stop click 61. Simultaneously with this, the indexing member 44 hinged to the leading end 43 of lever 33 is lifted so that push clicks 51 formed at both leading end portions of that indexing member 44 is brought into abutment engagement with pins 26 of wheels 5 and 7, respectively, whereby those pins are raised to rotate wheels 5 and 7 until the engaging state is released. Thus, wheels 5 and 7 are rotated one index by each depression of push button 14.

When push button 14 is released, indexing member 44 is moved down by the elastic force of springs 57 to swing lever 33 counter-clockwise so that knock member 77 knocks bell 78 to generate a ringing sound. Bell 78 is rung a number of times corresponding to the number of depressions.

When wheel 5, having been positioned to display the numeral "0" in aperture 2, is rotated one index in the aforementioned way, the numeral "1" appears in aperture 2, as shown in FIG. 1. If push button 14 is depressed again, numeral "2" is brought to appear in the aperture by a similar operation. More specifically, the numeral indicating the same number as that of the depressions of push button 14 is displayed in aperture 2 by rotational indexes of wheel 5. Wheel 7 is rotated, too, the same number of times as the number of rotational indexes of wheel 5.

Pin wheels 5 and 7 are rotationally indexed, while energizing return springs 29 and 29 mounted therein, respectively. Simultaneously as push button 14 is released, the bent arms 64 and 66 are swung counter-clockwise by the elastic forces of springs 73 and 73 so that stop clicks 61 and 63 retain pins 26 from above, whereby wheels 5 and 7 are not rotationally returned.

After push button 14 is depressed in the aforementioned way to display a desired numeral in aperture 2, push button 15 is depressed to display a numeral in aperture 3 which is to be added to the former numeral. When push button 15 is depressed, levers 37 and 41 and member 46 perform similar operations to those when push button 14 is depressed so that wheel 6 is rotated the same number of indexes as the number of the depressions to display the corresponding numeral in aperture 3. Wheel 7 is rotated, too, the same number of indexes as those of wheel 6.

Thus, wheel 7 is rotated the summed number of indexes of wheels 5 and 6.

The rotary wheels are fixed on spindle 20 such that the numeral to be displayed in aperture 4 is "0" in case the numerals displayed in both apertures 2 and 3 are "0". As a result, if push buttons 14 and 15 are depressed so that the rotary wheels 5 and 6 are rotationally indexed to display numerals in apertures 2 and 3, the added numerals are brought to appear in aperture 4.

After the push buttons 14 and 15 are depressed, the numeral giving the answer can be read out of aperture 4 if push button 16 is depressed in order to confirm the answer of the addition so that shielding plate 8 is moved down.

After the answer has been confirmed, push button 17 is depressed so that actuating lever 41 constituting the releasing mechanism is swung clockwise about spindle 22. At this instant, rod member 42, fixed to the leading end portion of actuating lever 41, is carried upwardly to abut against abutment members 67, 68 and 69 of bent arms 64, 65 and 66 from below to raise the same so that arms 64, 65 and 66 are swung clockwise about spindle 21. As a result, the retaining states of pins 26 by the stop clicks 61, 62 and 63 are released so that wheels 5, 6 and 7 are rotationally returned by elastic forces of return springs 29 to the positions where the numerals "0" appear in the apertures. After that, adding operations similar to the aforementioned ones can be performed.

In a further modified embodiment shown in FIGS. 10 to 14, pins 26 are replaced by ratchets.

Figure 10:
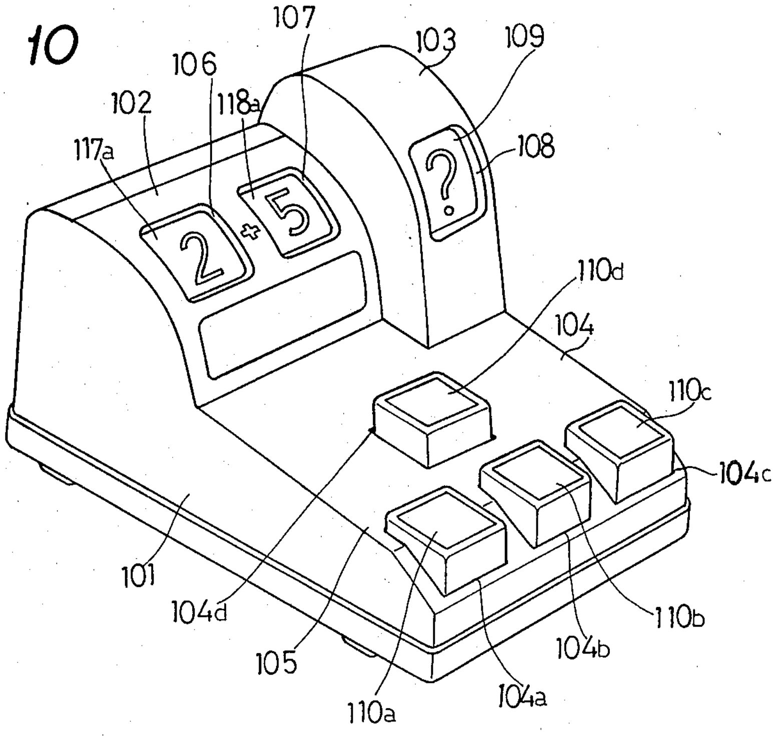
FIG. 10 is a perspective view showing the overall construction of the adding toy according to a third embodiment.

As shown in FIG. 10, a casing 101 is constructed of two-stepped bulging portions 102 and 103 which bulge upwardly, and a flat portion 105 which is formed with a plurality of openings 104*a*, 104*b*, 104*c* and 104*d*. Portion 102 is formed with two apertures 106 and 107, between which are displayed an addition sign (+) and in which there appear numerals to be added as displayed in the outer circumferences 117*a* and 118*a* of the rotary wheels. Portion 103 is formed with an aperture 108 in which there appears a numeral indicative of the added answer shielded by means of a rotatable shielding plate 109.

In opening 104*a* there is fitted a push button 110*a* for rotationally indexing in a simultaneous manner both a rotary wheel 117 (FIG. 11) displaying a numeral to be added and a rotary wheel 119 displaying a numeral indicative of the added answer. In opening 104*b* there is fitted a push button 110*b* for rotationally indexing both a rotary wheel 118 and wheel 119 in a simultaneous manner. In opening 104*c* there is fitted a push button 110*c* for rotating the shielding plate 109. In opening 104*d* there is fitted a push button 110*d* for rotationally returning the wheels 117 and 118.

Figure 11:
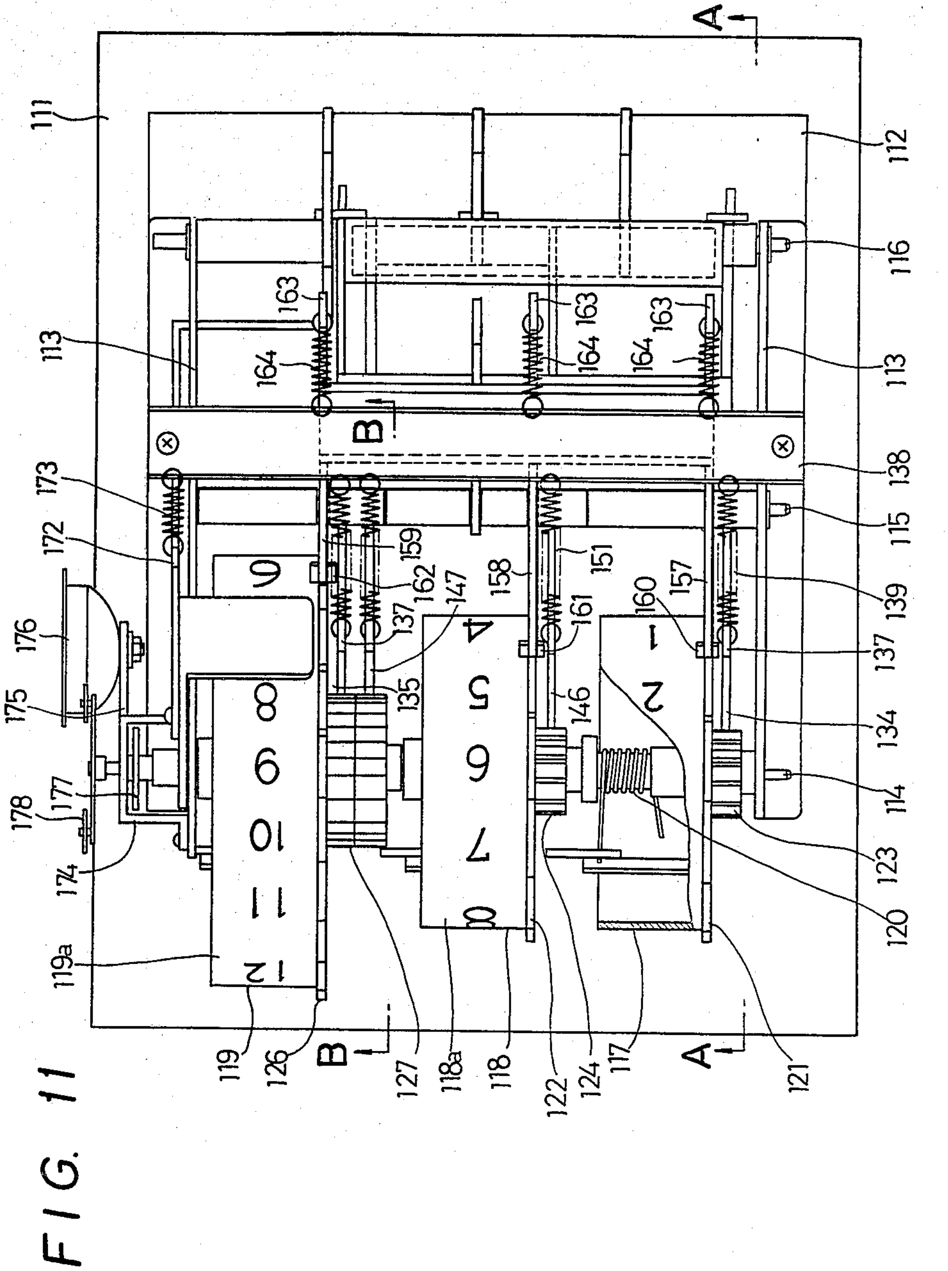
FIG. 11 is a top plan view showing the inside construction of the third embodiment.
Figure 12:
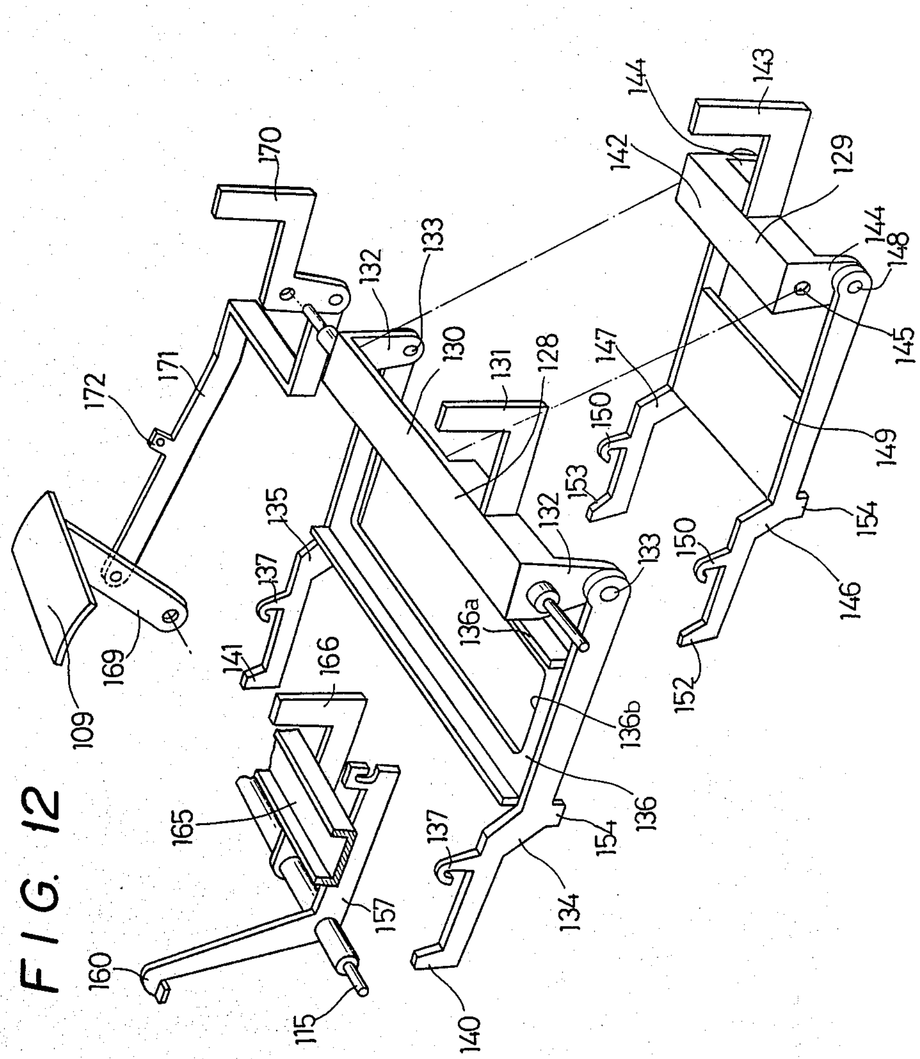
FIG. 12 is an explanatory perspective view showing the inside construction of the third embodiment with its major parts being exploded.
Figure 13:
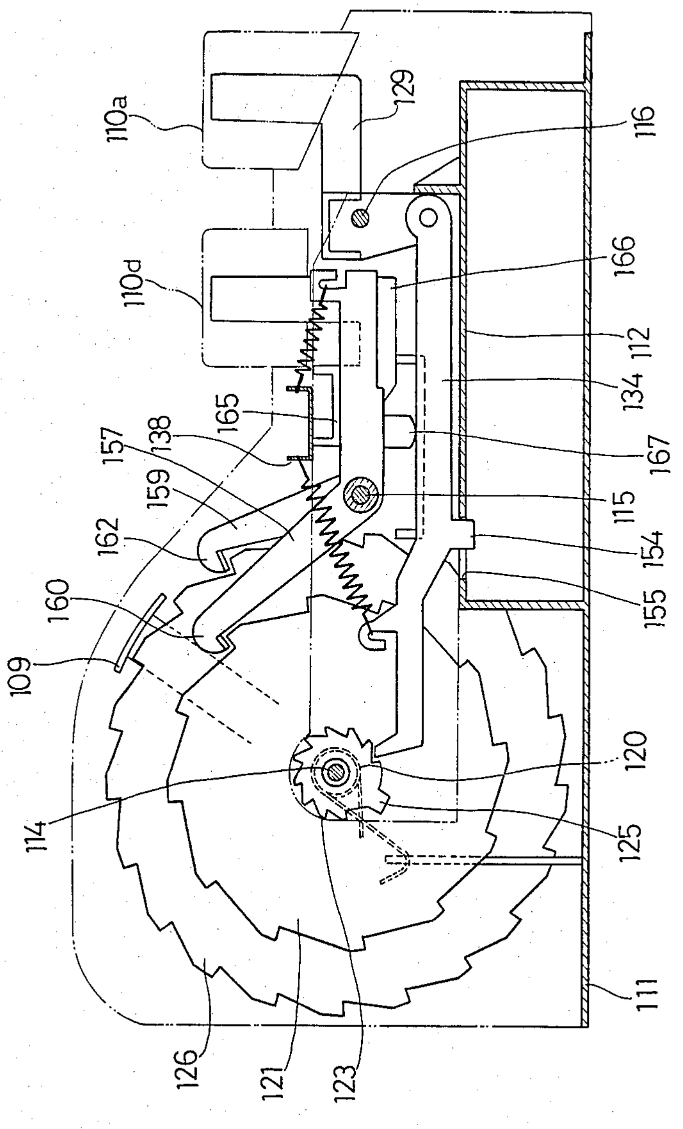
FIG. 13 is a section taken along line A—A of FIG. 11.
Figure 14:
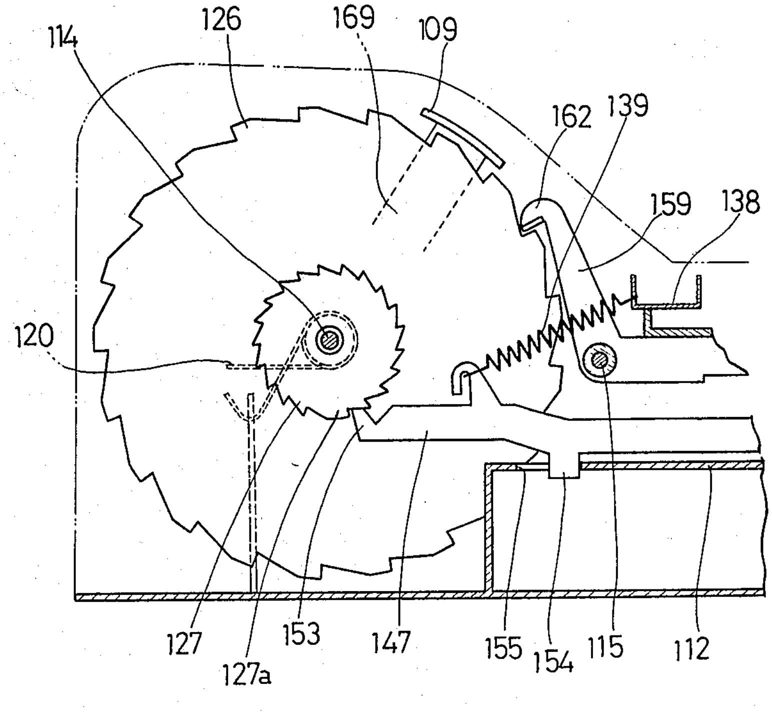
FIG. 14 is a section taken along line B—B of FIG. 11.

As shown in FIG. 11, there is placed on a bottom plate 111 a platform 112, on which there stands a pair of supporting plates 113 and 113 between which three spindles 114, 115 and 116 are supported.

On spindle 114 there are rotatably mounted both wheels 117 and 118 having an indentical shape and wheel 119 having a larger diameter. On the journals of wheels 117, 118 and 119 there are mounted coil springs 120 which are biased by the rotations of the wheels.

To one side portion of each of wheels 117 and 118 there are coaxially attached both first ratchets 121 and 122 having a slightly larger diameter than that of wheels 117 and 118. The teeth on ratchets 121 and 122 and on ratchets 123 and 124 are of the same number. Ratchets 123 and 124 are formed with stopper portions 125 (FIG. 13) for preventing wheels 117 and 118 from being rotated more than one rotation. On the outer circumferences 117*a* and 118*a* of wheels 117 and 118 there are displayed the numerals "0" to "10" to be added, which are positioned to correspond to the teeth of ratchets 121 and 122.

Similar to wheels 117 and 118, the rotary wheel 119 displaying the numeral indicative of the answer is made to have its one side portion covered with a first coaxial ratchet 126 (FIG. 14) having a large diameter and to display the numerals "0" to "20" for providing the answer on its outer circumference 119*a* at positions corresponding to the teeth of ratchet 126. To ratchet 126 there is coaxially attached a second ratchet 127 of small diameter, which is formed with the same number of teeth as that of ratchet 126 and which is partially formed with a stopper portion 127*a*.

Thus, the first and second ratchets perform the same actions of those of pins 26 used in the foregoing embodiments.

To spindle 116 there are hinged actuating levers 128 and 129 (FIGS. 12 and 13) which are made operative to move back and forth the clicks for rotationally indexing the wheels 117, 118 and 119. Actuating lever 128 is constructed to include: a crosslever 130 having a length substantially equal to the spacing between ratchets 123 and 127, an L-shaped member 131 attached to the side of crosslever 130 and having its leading end extending upwardly into push button 110*a*; and depending members 132 and 132 depending from both ends of crosslever 130. Spindle 116 is fitted in the bearing holes formed in members 132 and 132 so that actuating lever 128 is swung by depressing push button 110*a*.

To members 132 and 132 there are hinged through pins 133 indexing levers 134 and 135, between which is mounted a reinforcing plate 136 having both its width sides formed with upright portions 136*a* and its center portion formed with an opening 136*b*. Indexing levers 134 and 135 have their leading portions formed with hooked portions 137, which are connected by means of springs 139 (FIG. 11) to a support on supporting plate 113 so that levers 134 and 135 are elastically supported to the above and to this side (i.e., to the right as shown). Lever 134 has its leading end portion formed with a push click 140 which is made engageable with ratchet 123 from below, whereas lever 135 has its leading end portion formed with a push click 141 which is made engageable with ratchet 127 from below.

Actuating lever 129 (FIG. 12) has a substantially similar shape as that of lever 128. To an intermediate portion of a crosslever 142, having a length substantially equal to the spacing between second ratchets 124 and 127 of wheels 118 and 119, there is attached an L-shaped member 143 which has its leading end portion fitted in push button 110*b*. There are formed at both end portions of crosslever 142 depending members 114 and 114 which are formed with bearing holes 145 and 145 to receive spindle 116 so that crosslever 142 can be freely swung by depressing push button 110*b*. To members 144 and 144 there are hinged through pins 148 indexing levers 146 and 147 between which is mounted a reinforcing plate 149. Levers 146 and 147 have their leading portions formed on their upper sides with hook portions 150 to which are attached one end of springs 151 (FIG. 11) having their other end fixed on supporting plate 138 so that levers 146 and 147 are elastically supported to the above and to the side (i.e., to the right as shown). Lever 146 has its leading end portion formed into a push click 152 engageable with ratchet 124 from below. Lever 147 has its leading end portion formed into a push click 153 engageable with ratchet 127 from below.

Thus, a rotationally indexing mechanism is constructed including ratchets 123, 124 and 127, indexing levers 134, 135, 146 and 147 formed with push clicks, and actuating levers 128 and 129.

Levers 134, 135, 146 and 147 have their intermediate portions formed on their lower sides with projections 154 (FIG. 13) fitted in notches 155 formed in the platform 112 to regulate the forward and backward strokes of these levers.

To spindle 115 there are hinged the intermediate portions of arm levers 157, 158 and 159. Levers 157, 158 and 159 have their respective leading end portions formed with stop clicks 160, 161 and 162 which engage with ratchet 121 of wheel 117, ratchet 122 of wheel 118, and ratchet 126 of wheel 119, respectively, from above. These arm levers also have their trailing end portions formed with hooked portions 163, which are connected to springs 164 each having one end retained on supporting plate 138, so that levers 157, 158 and 159 are elastically supported to swing counter-clockwise (as viewed in FIG. 13) about spindle 115.

In the space defined by levers 157, 158 and 159 and supporting plate 138, there is arranged a crosslever 165, to which is fixed an L-shaped actuating lever 166 having one end fitted in push button **110*d* and its other end hinged to spindle 115 so that lever 166 is swung clockwise by depressing push button 110*d*. Lever 166 has its intermediate portion formed on its lower side with a protruding member 167, which protrudes downwardly, so that member 167 pushes down the indexing levers 134, 135, 146 and 147 to release the engaging states between push clicks 140, 141, 152 and 153 and ratchets 123 and 124**.

On spindle 114 outside of wheel 119, there is loosely mounted an arm lever 169 (FIGS. 12, 14) having a leading end, to which is attached shielding plate 109 for hiding the answer numeral. There is hinged to spindle 116 an actuating lever 170, which has one end fitted in push button **110*c* and its other end connected to lever 169 by means of a connecting lever 171 so that shielding plate 109 is rotated upwardly by depressing push button 110*c*. Lever 171 has its intermediate portion formed with a hooked portion 172, to which is connected a spring 173 having one end fixed to supporting plate 138 so that lever 171 is elastically supported to swing to this side (i.e., to the right as viewed in FIG. 11**).

To the leading portion at one side of supporting plate 113, there is attached an enclosure 174 having a generally C-shaped section to convey spindle 114. Enclosure 174 has its outer plate extended to provide a supporting plate 175 to which is attached a bell 176. A knock member 178 is swung through a gear mechanism 177, which is connected to spindle 114, so that bell 176 is rung by the rotations of spindle 114.

If push button **104*a* is depressed, wheels 117 and 119 are simultaneously rotated one index, and if push button 104*b* is depressed the wheels 118 and 119 are simultaneously rotated one index. As a result, wheel 119 displaying the numeral indicative of the added answer is rotated the added indexes of those of wheels 117 and 118 displaying the numerals to be added. If wheels 117, 118 and 119 are set at predetermined positions, the added answer of the numerals appearing at apertures 106 and 107 is made to appear at aperture 108**.

Because both wheels having their outer circumferences displaying the numerals to be added and the single wheel having its outer circumference displaying the numeral indicative of the added answer are rotationally indexed in a simultaneous manner by means of the rotationally indexing mechanism including pins or ratchets, it is possible to provide an adding toy which has a simple and trouble-free construction. Because the return springs to be biased by the rotational indexes are made to have their energies released through the releasing mechanism, the initial states can be restored by simple operations. Erroneous operations are prevented by incorporating the regulating clicks 82, the elastic members **35*a*, or the rocking member 81**.

I claim:

1. A numeral adding toy comprising:

a casing;

at least two first rotary wheels supported in said casing and having their outer circumferences displaying numerals to be added;

a second wheel rotatably supported in said casing and having its outer circumference displaying a numeral indicative of an added answer;

a plurality of engagement elements each mounted on one side of each of said first and second rotary wheels concentrically with said rotary wheels;

means having push clicks made engageable with said engagement elements of the respective rotary wheels for rotationally indexing said second rotary wheel and one of said two first rotary wheels in a simultaneous manner;

springs for biasing said respective rotary wheels in their returning directions;

stop clicks retaining said engagement elements of said respective rotary wheels for regulating the rotational returns of said respective rotary wheels; and means for releasing the retaining states between said stop clicks and said engagement elements.

2. A numeral adding toy as set forth in claim 1, wherein:

said rotationally indexing means for said first and second rotary wheels includes a plurality of first actuating members hinged to said casing, a plurality of indexing members having the leading end portions thereof formed with said push clicks and the base end portions thereof hinged to one of said first actuating members, respectively, and a spring for biasing each of said indexing members in the engaging direction of said push clicks, wherein one of said indexing members is provided for both said second rotary wheels and one of said two first rotary wheels and another for both said second rotary wheel and the other of said first rotary wheels.

3. A numeral adding toy as set forth in claim 2, wherein:

said indexing members are formed thereon with regulating clicks separately of said push clicks for preventing each of said first and second rotary wheels from being rotated more than two indexes.

4. A numeral adding toy as set forth in claim 1, 2 or 3, wherein:

the releasing means for said stop clicks includes a second actuating member hinged to said casing, a plurality of first arms having their leading end portions formed with said stop clicks and hinged to said casing in a manner to correspond to said first and second rotary wheels, respectively, and springs for biasing said arms in the engaging directions of said stop clicks, said arms being enabled to swing in the releasing direction of said stop clicks.

5. A numeral adding toy as set forth in claim 4, wherein:

said second actuating member includes a rod so arranged that it can engage with the base end portions of said first arms for swinging said first arms together in the releasing direction of said stop clicks.

6. A numeral adding toy as set forth in claim 4, wherein:

said indexing members of said rotationally indexing means include catch members so that they are enabled to swing in the releasing direction of said push clicks by the engagements between said second actuating members and said catch members.

7. A numeral adding toy as set forth in claim 1, further comprising:

elastic members in sliding contact with said first and second rotary wheels under a suitable pressure.

8. A numeral adding toy as set forth in claim 7, wherein:

said elastic members are mounted on members, which are adapted to operate the engagements of said push clicks with said engagement elements, so that they are brought into sliding contact with said rotary wheels when the latter are rotated.

9. A numeral adding toy as set forth in claim 7, wherein:

said elastic members are mounted on said first arms, which are formed with said stop clicks at their one ends, so that they are brought into sliding contact with said rotary wheels upon the engagements of said stop clicks with said engagement elements.

10. A numeral adding toy as set forth in claim 1, wherein:

said engagement elements for said first and second rotary wheels comprising a plurality of projections axially extending from one side of each of said rotary wheels.

11. A numeral adding toy as set forth in claim 10, wherein:

one of said plurality of projections is formed with a stopper member such that said push clicks engage with the projections formed with said stopper member to prevent said rotary wheels from being rotated more than one rotation.

12. A numeral adding toy as set forth in claim 1, wherein:

said engagement elements for said first and second rotary wheels comprise the teeth of ratchets which are so arranged on the sides of said rotary wheels that they can rotate integrally with said wheels.

13. A numeral adding toy as set forth in claim 2, further comprising:

a rocking member (81), for interfering with one of said first actuating members (33 or 37) upon the depression of the other said first actuating members (37 or 33), is arranged below said first actuating members (33, 37); and the fulcrum of rocking motion of said rocking member (81) is located at an intermediate position between said first actuating members (33,37) to prevent simultaneous depression of said first actuating members (33,37).

14. A numeral adding toy as set forth in claim 2 or 3, further comprising:

a bell and a knocking member for said bell so arranged in said casing that said knock member cooperates with said indexing members to knock said bell in response to the indexing operations of said indexing members.

15. A numeral adding toy as set forth in claim 1, wherein:

said respective rotary wheels have their outer circumferences displaying pictures indicative of the number corresponding to said numerals.

* * * * *